Patented July 22, 1952

2,604,412

UNITED STATES PATENT OFFICE 2,604,412

PROCESS FOR THE PRODUCTION OF A CELLULOSE ETHER MOLDING POWDER

Henry Dreyfus, deceased, late of London, England, by Claude Bonard, administrator, London, England, and James Henry Rooney and Bernard Shaw, Spondon, near Derby, England, assignors to Celanese Corporation of America, a corporation of Delaware No Drawing. Application December 12, 1947, Serial No. 791,448. In Great Britain, October 16, 1942

11 Claims. (Cl. 106—177)

This invention relates to a plasticised molding composition having a basis of ethyl or other lower alkyl cellulose which is soluble in methanol, ethanol or the propanols.

This application is a continuation-in-part of application, S. No. 521,644, filed 9th February 1944, now Patent No. 2,435,999.

According to the present invention a moulding powder is made from a polymer which is soluble in an alcohol selected from the class consisting of methanol, ethanol and the propanols, by a process which comprises forming a filterable solution of the polymer at a temperature above 70° C. in a homogeneous liquid mixture comprising a normally liquid plasticiser for the polymer, water and an alcohol selected from the said class, the ratio of total liquid to polymer being between 120:100 and 200:100 and the ratio of plasticiser to polymer being between 13:100 and 75:100, precipitating a homogeneous powder containing polymer, plasticiser, water and alcohol by allowing the solution to cool while stirring, collecting the resulting powder, and evaporating the alcohol and water therefrom.

The process of the invention enables the stock to be filtered while in the condition of a hot solution, and yields a stock in which polymer and plasticiser are in intimate admixture, which can readily be freed from the relatively small proportion of volatile liquid (aqueous alcohol) present, and which does not require an expensive grinding operation to reduce it to a particle-size suitable for moulding. From the plasticised stock, transparent mouldings of good clarity, tenacity and impact strength can be obtained.

An important feature of the present invention is the low ratio of total liquid to polymer (120:100 to 200:100). It has been found that with this low ratio, when the hot solution of polymer and plasticiser is cooled, precipitation of both occur together (presumably owing to entanglement of the molecules of polymer and plasticiser at these high concentrations) giving a product in which plasticiser and polymer are intimately associated and intermingled. At lower concentrations, on the other hand, precipitation of the one component can occur while the other is still in solution giving a non-homogeneous product.

The ratio of non-solvent to solvent constituents is also important. In a typical case it will be found that when the ratio is below a certain value a solution of the polymer made at about 70–80° C. will remain a liquid solution even when cooled to ordinary temperatures. As the ratio is increased beyond this value a range is reached within which a solution made at the elevated temperature forms a gel on cooling to ordinary temperatures. A further increase in the ratio gives solutions which when cooled from the elevated temperature to ordinary temperature give a granular stock containing the polymer, plasticiser, alcohol and water. With a still further increase in the ratio the liquid medium becomes incapable of dissolving the polymer even at temperatures as high as 80° C. The mixture may form an unfilterable gel at such temperatures or, when the ratio of non-solvent to solvent constituents is sufficiently high, may be quite inert towards the polymer. For the process of the present invention the ratio of non-solvent to solvent constituents must, of course, be within the range giving solutions at elevated temperatures from which precipitation occurs during cooling to ordinary temperatures. Using as the polymer an ethanol-soluble ethyl cellulose, and with ethanol as the alcohol and tricresyl phosphate as the plasticiser, the best results have been obtained when the ratio of plasticiser to polymer is 15:100 to 75:100 and the ratio of ethanol to water is 2:1 to 4:1. In any particular case, having fixed the ratio of plasticiser to polymer, simple trials will determine a suitable ratio of alcohol to water, which will, for most combinations of the polymer and plasticiser be found within the range 2:1 to 4:1.

The stirring may be started before cooling sets in, or after the solution has cooled to some extent, and may be continued after the completion of the cooling.

The following examples illustrate the invention:

Example 1

In a closed mixer maintained at a temperature of 75–80° C. a solution is made of the following composition, all the parts being by weight:

100 parts ethyl cellulose
15 parts tricresyl phosphate
80 parts ethanol
35 parts water The ethyl cellulose employed has an ethoxy content of about 48% and a viscosity between about 100–400 centipoises, determined on a 5% solution by weight in a mixture of 80 parts toluene and 20 parts ethanol at 25° C.

The solution is filtered through a cannon-filter maintained at 75° C. whence it passes to a mixer in which it is allowed to cool to room temperature (say 25° C.) and is stirred by the blades of the mixer. If a very fine powder suitable for injection-moulding is required the stirring is continued for longer than if a coarser powder is required, for instance for compression moulding, and the stirring may even be dispensed with if a coarse powder is required. As the solution cools, whether or not it be stirred, precipitation sets in and eventually the whole body of solution is converted into a powder. The powder is discharged from the mixer and dried by evaporation. The dried powder may be used for the production of moulded articles by the hot compression-moulding process or by injection-moulding.

Moulding powders obtained as described above are particularly suitable for the production of transparent sheet materials by a compression-moulding operation. Suitable conditions are:

Temperature about 140° C.–150° C.
Pressure about 1000–1500 lb. per sq. in.

*Example 2*

The process is carried out as in Example 1 except that the solution has the following composition:

100 parts ethyl cellulose (as specified in Example 1)
30 parts tricresyl phosphate
80 parts ethanol
25 parts water

*Example 3*

The process is carried out as described in Example 1 except that a solution is employed of the following composition:

100 parts ethyl cellulose (as specified in Example 2)
70 parts tricresyl phosphate
80 parts ethanol
24 parts water The proportions of water in Examples 1–3 are such that the aqueous alcohol is a non-solvent for the plasticiser at 25° C. but a solvent therefor at 75° C. Instead of tricresyl phosphate, diethyl phthalate or dibutyl phthalate may be used as the plasticiser for ethyl cellulose. Other solvent plasticisers for the cellulose ether may be employed.

The moulding powders of the invention may be shaped by other processes than that of compression-moulding. They may, for example, be injection-moulded or extruded. The powders may be shaped while they still contain a small proportion, e. g. 5% by weight of the non-solvent.

Instead of the ethyl cellulose specified in the examples other alcohol-soluble thermoplastic polymers may be used, for example propyl cellulose, butyl cellulose, polyvinyl acetate and polyvinyl butyral.

The plasticised stock of the invention can be employed to produce articles of various shapes by pressure moulding, injection-moulding or extrusion. Filling materials, for example wood flour, asbestos floats and fibres, fibrous material having a basis of cellulose or regenerated cellulose, and mineral pigments, for example barium sulphate may be incorporated in the stock. Thus, for example, fillers may be mixed with the powder obtained by cooling the hot solution of plasticized polymer, or introduced into the hot solution of plasticised polymer after filtration.

The plasticised stock of the invention may also be used in the production of laminated materials, for example by the union of layers of paper, fabric or wood. Among such laminated products are stiff or semi-stiff fabrics suitable for the production of articles of wearing apparel, for example, collars, shirt fronts, belts, straps, and sweat bands for hats; rigid laminated fabrics suitable for the construction of wing sections of aircraft and materials such as plywood and fibre board.

Having described our invention, what we desire to secure by Letters Patent is:

1. Process for the production of a moulding powder from a water-insoluble ethanol-soluble cellulose ether, which comprises forming a filterable solution of the cellulose ether at a temperature above 70° C. in a homogeneous liquid mixture comprising a normally liquid solvent plasticiser for the cellulose ether, water and ethanol, the ratio of total liquid to cellulose ether being between 120:100 and 200:100 and the ratio of plasticiser to cellulose ether being between 15:100 and 75:100, converting the whole body of the solution into a homogeneous powder containing cellulose ether, plasticiser, water and ethanol, by allowing the solution to cool while stirring, collecting the resulting powder and evaporating the ethanol and water therefrom.

2. Process for the production of a moulding powder from a water-insoluble ethanol-soluble ethyl cellulose, which comprises forming a filterable solution of the ethyl cellulose at a temperature above 70° C. in a homogeneous liquid mixture comprising a normally liquid solvent plasticiser for the ethyl cellulose, water and ethanol, the ratio of total liquid to ethyl cellulose being between 120:100 and 200:100, the ratio of plasticiser to ethyl cellulose being between 15:100 and 75:100, and the ratio of ethanol to water being between 2:1 and 4:1, converting the whole body of the solution into a homogeneous powder containing ethyl cellulose, plasticiser, water and ethanol, by allowing the solution to cool while stirring, collecting the resulting powder, and evaporating the alcohol and water therefrom.

3. Process for the production of a moulding powder from a water-insoluble ethanol-soluble ethyl cellulose of ethoxy content 48 to 49.5% and viscosity 100 to 400 centipoises, which comprises forming a filterable solution of the ethyl cellulose at a temperature above 70° C. in a homogeneous liquid mixture comprising a normally liquid solvent plasticiser for the ethyl cellulose, water and ethanol, the ratio of total liquid to ethyl cellulose being between 120:100 and 200:100, the ratio of plasticiser to ethyl cellulose being between 15:100 and 75:100, and the ratio of ethanol to water being between 2:1 and 4:1, converting the whole body of the solution into a homogeneous powder containing ethyl cellulose, plasticiser, water and ethanol, by allowing the solution to cool while stirring, collecting the resulting powder and evaporating the alcohol and water therefrom.

4. Process for the production of a moulding powder from a water-insoluble ethanol-soluble ethyl cellulose, which comprises forming a filterable solution of the ethyl cellulose at a temperature above 70° C. in a homogeneous liquid mixture comprising tricresyl phosphate, water and ethanol, the ratio of total liquid to ethyl cellulose being between 120:100 and 200:100, the ratio of plasticiser to ethyl cellulose being between 15:100 and 75:100, and the ratio of ethanol to water being between 2:1 and 4:1, converting the whole body of the solution into a homogeneous powder containing ethyl cellulose, plasticiser, water and ethanol, by allowing the solution to cool while stirring, collecting the resulting powder, and evaporating the alcohol and water therefrom.

5. Process for the production of a moulding powder from a water-insoluble ethanol-soluble ethyl cellulose of ethoxy content 48 to 49.5% and viscosity 100 to 400 centipoises, which comprises forming a filterable solution of the ethyl cellulose at a temperature above 70° C. in a homogeneous liquid mixture comprising tricresyl phosphate, water and ethanol, the ratio of total liquid to ethyl cellulose being between 120:100 and 200:100, the ratio of plasticizer to ethyl cellulose being between 15:100 and 75:100, and the ratio of ethanol to water being between 2:1 and 4:1, converting the whole body of the solution into a homogeneous powder containing ethyl cellulose, plasticiser, water and ethanol, by allowing the solution to cool while stirring, collecting the resulting powder, and evaporating the alcohol and water therefrom.

6. Process for the production of a moulding powder from a water-insoluble ethanol-soluble ethyl cellulose, which comprises forming a filterable solution of the ethyl cellulose at a temperature above 70° C. in a homogeneous liquid mixture comprising diethyl phthalate, water and ethanol, the ratio of total liquid to ethyl cellulose being between 120:100 and 200:100, the ratio of plasticiser to ethyl cellulose being between 15:100 and 75:100, and the ratio of ethanol to water being between 2:1 and 4:1, converting the whole body of the solution into a homogeneous powder containing ethyl cellulose, plasticiser, water and ethanol, by allowing the solution to cool while stirring, collecting the resulting powder, and evaporating the alcohol and water therefrom.

7. Process for the production of a moulding powder from a water-insoluble ethanol-soluble ethyl cellulose of ethoxy content 48 to 49.5% and viscosity 100 to 400 centipoises, which comprises forming a filterable solution of the ethyl cellulose at a temperature above 70° C. in a homogeneous liquid mixture comprising diethyl phthalate, water and ethanol, the ratio of total liquid to ethyl cellulose being between 120:100 and 200:100, the ratio of plasticiser to ethyl cellulose being between 15:100 and 75:100, and the ratio of ethanol to water being between 2:1 and 4:1, converting the whole body of the solution into a homogeneous powder containing ethyl cellulose, plasticizer, water and ethanol, by allowing the solution to cool while stirring, collecting the resulting powder, and evaporating the alcohol and water therefrom.

8. Process for the production of a moulding powder from a water-insoluble ethanol-soluble ethyl cellulose, which comprises forming a filterable solution of the ethyl cellulose at a temperature above 70° C. in a homogeneous liquid mixture comprising dibutyl phthalate, water and ethanol, the ratio of total liquid to ethyl cellulose being between 120:100 and 200:100, the ratio of plasticiser to ethyl cellulose being between 15:100 and 75:100, and the ratio of ethanol to water being between 2:1 and 4:1, converting the whole body of the solution into a homogeneous powder containing ethyl cellulose, plasticiser, water and ethanol, by allowing the solution to cool while stirring, collecting the resulting powder, and evaporating the alcohol and water therefrom.

9. Process for the production of a moulding powder from a water-insoluble ethanol-soluble ethyl cellulose of ethoxy content 48 to 49.5% and viscosity 100 to 400 centipoises, which comprises forming a filterable solution of the ethyl cellulose at a temperature above 70° C. in a homogeneous liquid mixture comprising dibutyl phthalate, water and ethanol, the ratio of total liquid to ethyl cellulose being between 120:100 and 200:100, the ratio of plasticiser to ethyl cellulose being between 15:100 and 75:100, and the rate of ethanol to water being between 2:1 and 4:1, converting the whole body of the solution into a homogeneous powder containing ethyl cellulose, plasticiser, water and ethanol, by allowing the solution to cool while stirring, collecting the resulting powder, and evaporating the alcohol and water therefrom.

10. Process for the production of a moulding powder from a water-insoluble ethanol-soluble cellulose ether, which comprises forming a filterable solution of the cellulose ether at a temperature above 70° C. in a homogeneous liquid mixture comprising a normally liquid solvent plasticiser for the cellulose ether, water and ethanol, the ratio of total liquid to polymer being between 120:100 and 200:100 and the ratio of plasticiser to cellulose ether being between 15:100 and 75:100, filtering the hot solution, converting the whole body of the solution into homogeneous powder containing cellulose ether, plasticiser, water and ethanol, by allowing the solution to cool while stirring, collecting the resulting powder and evaporating the ethanol and powder therefrom.

11. Process for the production of a moulding powder from a water-insoluble ethanol-soluble ethyl cellulose, which comprises forming a filterable solution of the ethyl cellulose at a temperature above 70° C. in a homogeneous liquid mixture comprising a normally liquid solvent plasticiser for the ethyl cellulose, water and ethanol, the ratio of total liquid to ethyl cellulose being between 120:100 and 200:100, the ratio of plasticiser to ethyl cellulose being between 15:100 and 75:100, and the ratio of ethanol to water being between 2:1 and 4:1, filtering the hot solution, converting the whole body of the solution into a homogeneous powder containing ethyl cellulose, plasticiser, water and ethanol, by allowing the solution to cool while stirring, collecting the resulting powder, and evaporating the alcohol and water therefrom.

CLAUDE BONARD,
*Administrator of the Estate of Henry Dreyfus, Deceased.*

JAMES HENRY ROONEY.
BERNARD SHAW.

REFERENCES CITED

The following references are of record in the file of this patent:

UNITED STATES PATENTS

| Number | Name | Date |
|---|---|---|
| Re. 22,812 | Jenkins | Dec. 3, 1946 |
| 2,199,386 | Bass et al. | May 7, 1940 |
| 2,254,904 | Moss | Sept. 2, 1941 |